United States Patent [19]

Oohira et al.

[11] 4,083,431
[45] Apr. 11, 1978

[54] ELEVATOR CONTROL APPARATUS

[75] Inventors: Takeshi Oohira; Tomiaki Kurihara, both of Katsuta, Japan

[73] Assignee: Hitachi, Ltd., Japan

[21] Appl. No.: 680,858

[22] Filed: Apr. 27, 1976

[30] Foreign Application Priority Data

May 9, 1975 Japan ................... 50-54468

[51] Int. Cl.² ............................................. B66B 1/28
[52] U.S. Cl. ................................................. 187/29 R
[58] Field of Search ................ 187/29; 318/211, 212, 318/227

[56] References Cited

U.S. PATENT DOCUMENTS

| | | | |
|---|---|---|---|
| 3,613,835 | 10/1971 | Vizzotto ................................ | 187/29 |
| 3,627,080 | 12/1971 | Yuminaka et al. ..................... | 187/29 |
| 3,708,734 | 1/1973 | Rowe .................................... | 318/212 |
| 3,777,855 | 12/1973 | Boyldew et al. ...................... | 187/29 |
| 3,918,552 | 11/1975 | Kameyama et al. ................... | 187/29 |

*Primary Examiner*—B. Dobeck
*Assistant Examiner*—W. E. Duncanson, Jr.
*Attorney, Agent, or Firm*—Craig & Antonelli

[57] ABSTRACT

A bridge circuit including a couple of thyristors and a two diodes is connected between a three-phase AC-power supply and a three-phase induction motor for driving an elevator car. The bridge circuit is adapted to make up a controlled rectifier circuit or an inverse-parallel connection circuit of thyristors, as the case may be, by switching a plurality of contactors. At the time of starting and accelerating the elevator car, the bridge circuit is changed to constitute an inverse-parallel connection circuit of thyristors to which a signal for a sufficiently high speed command is applied. This speed command is applied to a phase shifter, which fires the thyristors in inverse-parallel connection at a sufficiently large conduction angle. In consequence, the three-phase induction motor produces a sufficiently large accelerating torque, so that the car is accelerated according to differences between the accelerating torque and the elevator car load torque. When the accelerated car reaches a deceleration-starting point, the speed command in changed to another command decelerating the car at a predetermined rate toward a destination. At the same time, the phase shifter is changed over to receive a deviation signal between the speed command signal and the output signal of the tachometer generator connected to the motor. The inverse-parallel connection of thyristors is changed over to the controlled rectifier circuit connection. The motor is thus decelerated by a speed feedback control system of a DC braking type.

16 Claims, 12 Drawing Figures

ELEVATOR CONTROL APPARATUS

This invention relates to an improvement in a control apparatus for use in an AC-operated elevator.

The control apparatus for use in the AC-operated elevator with an induction motor as a driving source has undergone changes in the past.

Firstly, two induction motors each provided with a different synchronous speed have been used, in which the starting and accelerating operation of the elevator car is effected by use of the driving torque of the motor with the smaller number of poles (or a high-speed motor) while the decelerating operation thereof is accomplished by the regenerative braking torque of the motor with the larger number of poles (or a low-speed motor). The decelerated car is subjected to a creeping operation at a low speed balancing the load torque, which is in the vicinity of the synchronous speed of the low-speed motor and then is stopped by an electromagnetic brake at the destination. In such a control apparatus, the creeping operation at low speed results in a longer operating time and besides provides an uncomfortable sense of ride at the time of deceleration and stoppage.

Secondly, in order to obviate this disadvantage, a controlling apparatus of the speed feedback type has been employed in which the electric braking of the induction motor is utilized for deceleration. The electric braking operation is performed by a braking-torque control apparatus capable of continuously controlling DC braking, regenerative braking or reverse-phase braking torque by use of thyristors. This type of apparatus utilizes the conventional notch acceleration. At the time of deceleration, a speed command for decreasing the speed as a function of position is generated, so that a braking-torque control element using thyristors is controlled by differences between the actual speed and the command speed. This construction makes it possible to keep deceleration speed characteristics substantially rectilinear until the car is stoppd on the one hand and also to attain a shortened operation time as well as an improvement in a feeling of comfortable ride on the other.

A further development of the control apparatus includes driving torque control elements represented by thyristors in inverse-parallel connection in order to provide smoother speed characteristics from starting of the car to its arrival at a given floor, thus permitting a speed feedback control over the entire range of car operation. More specifically, an acceleration speed command for increasing a speed as a function of time and a deceleration speed command for decreasing speed as a function of position, are generated. During the accelerating operation, the thyristors in inverse-parallel connection (the driving torque control elements) are phase-controlled in accordance with the differences between the acceleration command speed and the actual speed. At the time of deceleration, on the other hand, the thyristors in the controlled rectifier circuit (the braking torque control elements associated with the DC braking) are phase-controlled in accordance with the differences between the actual speed and the deceleration command speed.

This type of control apparatus has the following shortcomings:

(1) False economy

There are the following problems with the speed feedback control by use of the thyristors in inverse-parallel connection, for instance, for the braking torque control elements and besides the driving torque control elements: During the steady running operation after completion of acceleration control, the thyristors in inverse-parallel connection are preferably kept in a fully conducting state so as to enable the induction motor to produce a maximum output torque in order to raise coefficient of thyristor utilization and achieve good control stability. During the accelerating operation, by contrast, the thyristors in inverse-parallel connection are controlled in accordance with the differences between a speed command voltage Vs and an actual speed signal or voltage Vp of the tachometer generator. If the thyristors are to be successfully conducted fully during the steady running operation, it is necessary that the differences in voltage Vs − Vp is set at a sufficiently large value. During the decelerating operation, however, the thyristors are used as braking torque control elements to be controlled in accordance with the difference between the actual speed signal Vp and the speed command voltage Vs, namely, Vp − Vs. In contrast with the accelerating operation, therefore, the actual speed signal Vp must be set higher than the speed command voltage Vs. During the decelerating operation, it is also necessary to adjust the gain of the control circuit by setting the two operating voltages at a sufficiently large level in order to increase the floor-arriving accuracy of the elevator car. For this reason, the operating voltage in the speed feedback control system must be set at different levels for the respective operations of acceleration and deceleration. This makes the circuit arrangement complex and high in cost.

(2) Low operating efficiency of elevator

The elevator is given a speed command for progressively increasing the speed at a fixed rate and then is subjected to an acceleration control, so that a fixed acceleration time of the elevator car is obtained. By the way, with the fixed torque produced by a motor, the time required for acceleration of the elevator car is shorter under a light load than under a heavy load. Since the speed command provides a fixed accelertion time independently of the load according to the control apparatus under consideration, it is necessary that the acceleration time is inevitably set longer under a heavy load. Under a light load, therefore, the surplus torque of the motor is intentionally withheld to lengthen the acceleration time, resulting in a lower operating efficiency of the elevator car.

Accordingly, it is an object of the present invention to provide a economical apparatus for controlling an elevator which may give a satisfactory performance.

The main feature of the present invention resides in that, in an elevator comprising driving torque control elements for continuously controlling the driving torque generated in an induction motor and braking torque control elements for continuously controlling the braking torque, the driving torque control elements are controlled with an open-loop control for speed regulation during the accelerating operation of the elevator car, while the braking torque control elements are subjected to a speed feedback control during the deceleration operation of the elevator car.

The driving torque control elements may be controlled by an acceleration command, a torque command or a speed command. It suffices if the driving torque is increased in such a manner that a feeling of a comfortable ride in the elevator car is not adversely affected by the acceleration. For the acceleration and torque other than the speed, therefore, a closed-loop (feedback) control is available.

According to the present invention, a speed feedback control is effected at the time of deceleration, and therefore at least a device for producing a speed command during the decelerating operation is required. If the speed command generator is adapted to produce an acceleration command at the time of acceleration, a desired acceleration of the elevator car and the further simplification of the control apparatus may be achieved.

In the case of a single-speed motor, the DC braking and the reverse-phase braking torque may be used for a braking torque. When a two-speed motor is used, on the other hand, it may be considered for the two-speed motor to be switched over from a regenerative braking torque at the low speed side of its operation to the DC braking torque. However, for the control stability and simplicity of the apparatus, it is most suitable to control the DC braking torque.

The present invention will be apparent from the following detailed description taken in conjunction with the accompanying drawings, in which.

The present invention will be described in detail below with reference to the preferred embodiments shown in the accompanying drawings.

Figure 1:
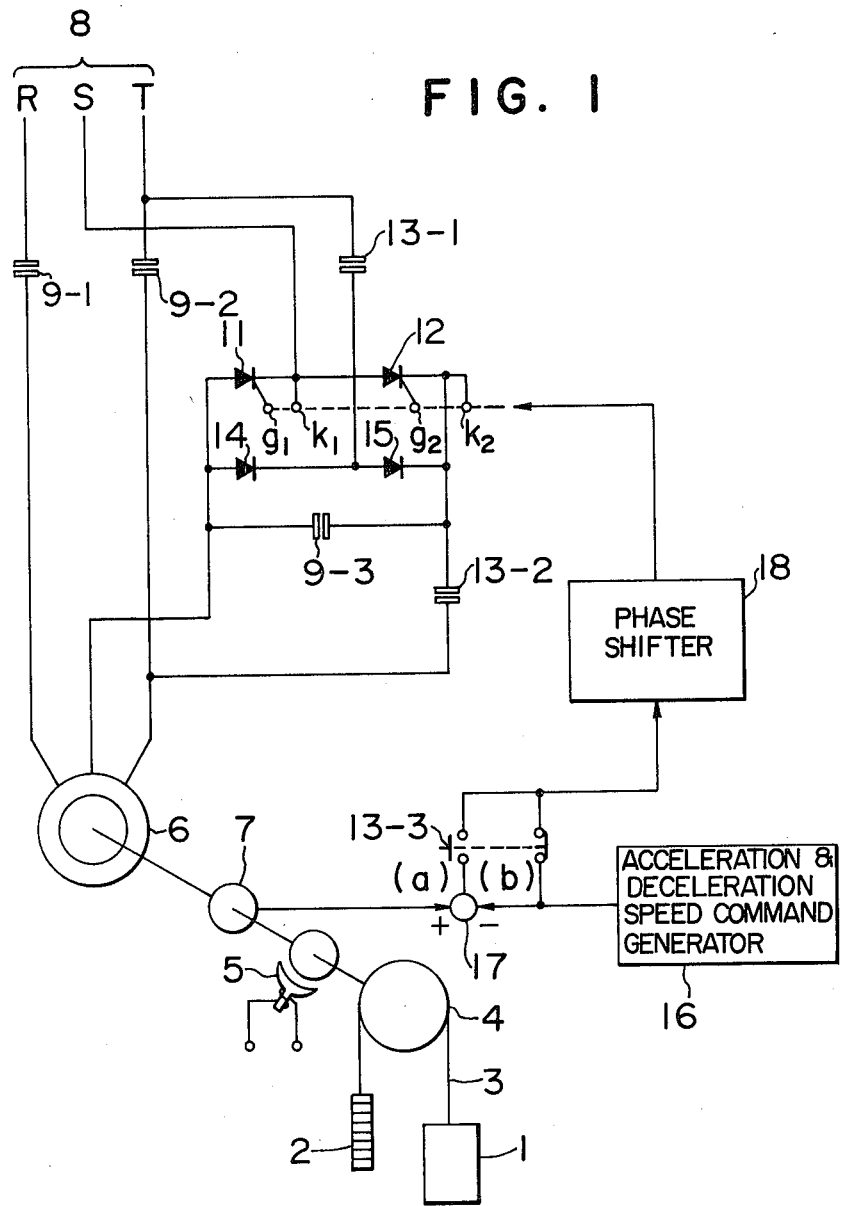
FIG. 1 is a diagram showing the construction of an embodiment of the control apparatus for AC-operated elevator cars according to the present invention.

The construction of an embodiment of the control apparatus for the AC-operated elevator according to the present invention is shown in FIG. 1.

An elevator car 1 and a counterweight 2 are hung on a sheave 4 by way of ropes 3. The sheave 4 is coupled to a three-phase induction motor 6 through a reduction gear not shown and an electromagnetic brake 5. The motor 6 is coupled to a tachometer generator 7.

Figure 2A:
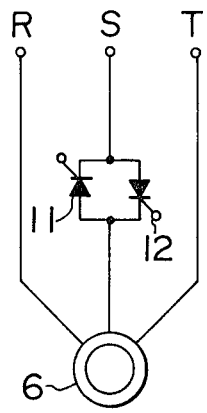
FIGS. 2a and 2b are diagrams for explaining the main circuit shown in the embodiment of FIG. 1.

The three-phase induction motor 6 is electrically connected to a three-phase AC power supply 8 through driving torque control elements or braking torque control elements. When contactors 9 (including contact elements 9-1, 9-2 and 9-3) are closed, for instance, the main circuit arrangement connected between the power supply 8 and the motor 6 may be formed as shown in FIG. 2a. In other words, an inverse-parallel connection circuit of thyristors 11 and 12 is connected between the S-phase terminal of the three-phase AC power supply 8 and an input terminal of the inductor motor 6. It is well known that the torque generated in the induction motor can be regulated in a range between single-phase torque and three-phase torque by controlling a single-phase voltage by means of controlling the firing of the thyristors 11 and 12. In the embodiment under consideration, therefore, the thyristors in inverse-parallel connection are used for the driving torque regulating elements.

Figure 2B:
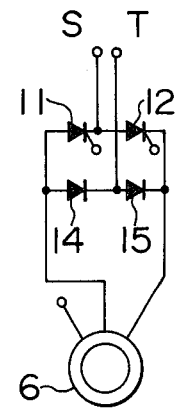

When the contactors 9 are opened and the contactors 13 (including contact elements 13-1 and 13-2) are closed, the main circuit arrangement is formed as shown in FIG. 2b. In other words, the main circuit is adapted to make up a controlled rectifier circuit which receives AC power from the two phase terminals S and T of the three-phase power supply and then drain direct current into the three-phase induction motor 6 at the two terminals. This controlled rectifier circuit makes up a mixed bridge comprising the thyristors 11, 12 and diodes 14, 15. By controlling the firing of the thyristors 11 and 12, it is now possible to generate DC braking torque in the induction motor 6 and to regulate the magnitude thereof. In this case, the controlled rectifier circuit including the thyristors 11, 12 and diodes 14, 15 makes up braking torque regulating elements for the induction motor 6.

The speed command for deceleration generated by the acceleration and deceleration speed command generator 16 is applied to the comparator 17 where it is compared with the output of the tachometer generator 7. The resulting deviation signal is applied to the phase shifter 18 through an auxiliary contact element 13-3(a) of the contactor 13. On the other hand, the acceleration command output of the acceleration and deceleration speed command generator 16 is directly applied to the phase shifter 18 through an auxiliary contact element 13-3(b) of the contactor 13.

In this circuit arrangement, the contactor 9 is closed and then the acceleration and deceleration speed command generator 16 is actuated with the main circuit arranged as shown in FIG. 2a at the time of starting the elevator car. It is here assumed that the command voltage generated by the acceleration and deceleration speed command generator 16 takes such a pattern as shown in FIG. 3b.

Figure 3A:
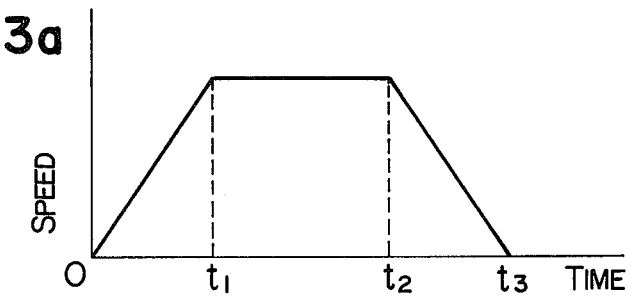
FIGS. 3a and 3b are diagrams showing the speed of the elevator car and the deceleration command voltage.
Figure 3B:
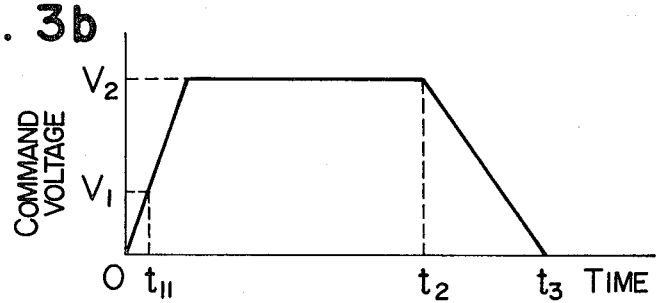

When the speed characteristics as shown in FIG. 3a are required for the elevator car, the command voltage should preferably undergo changes as shown in FIG. 3b. The period of time from 0 to $t_1$ represents an acceleration period, the time from $t_1$ to $t_2$ a fixed speed period, and time from $t_2$ to $t_3$ a deceleration period. As will be seen from FIGS. 3a and 3b, the rise of the command voltage is set steeper than the actual speed increase of the elevator car in the acceleration period. This is for the purpose of fully conducting the thyristors in inverse-parallel connection before the fixed speed period to achieve stable speed control by taking advantage of maximum available torque of the induction motor. To achieve this purpose, the phase shifter should be adapted to produce a signal of the largest conduction angle in the course of the acceleration period from 0 to $t_1$.

Figure 4:
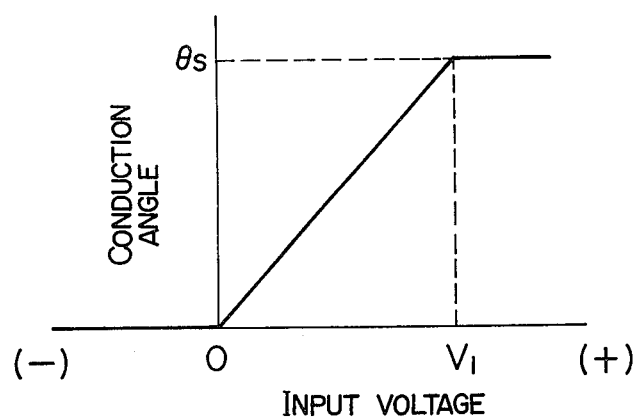
FIG. 4 shows a characteristic diagram of the phase shifter.

The conduction angle characteristics versus the input voltage of the phase shifter 18 are shown in FIG. 4. It will be noted that the conduction angle increases linearly with respect to the input voltage increase of 0 to $V_1$. After the input voltage exceeds $V_1$, the conduction angle does not increase. The largest conduction angle is thus $\theta$s, where the thyristors 11 and 12 are considered to be in a fully conducting state.

When the phase shifter of such characteristics is used, the command voltage generated by the acceleration and deceleration speed command generator 16 has such a steep rise that it reaches the saturation voltage $V_1$ of the phase shifter 18 at the time point $t_{11}$ in the course of the acceleration period, as shown in FIG. 3b. By the way, $V_2$ shows the maximum value of the command voltage. The length of this period from 0 to $t_{11}$ should be determined in such a manner that the rate of acceleration change (referred to as physiological constant), which generally should not be higher than 2 m/sec$^3$, does not adversely affect a feeling of undergoing a comfortable ride and that the acceleration torque can be raised as quickly as possible to utilize the maximum torque of the motor. Generally, the maximum acceleration is 1 m/sec$^2$, on the basis of which maximum acceleration a speed change at the time of acceleration is determined.

Figure 5:
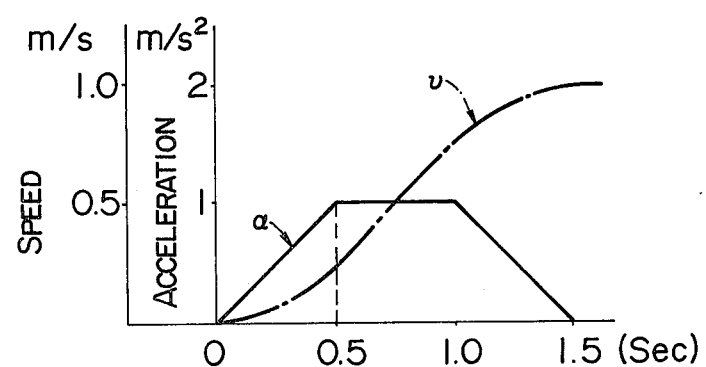
FIG. 5 is a diagram for explaining acceleration control device according to the invention.

The manner in which the speed at the time of acceleration is determined will be explained with reference to FIG. 5. In this drawing, time is plotted on the horizontal axis and acceleration (m/sec$^2$) and speed (m/sec) on the vertical axis. Assuming that the maximum acceleration is 1 m/sec$^2$ and rate of acceleration change (physiological constant) 2m/sec$^3$ as mentioned above, an acceleration curve $\alpha$ is obtained. The speed change associated with this curve takes the form of curve $v$. The range of fixed acceleration begins at 0.5 sec. while the thyristors are preferably fully conducted, that is, the phase shifter 18 is saturated.

Accordingly, the command voltage to be applied to the phase shifter 18 may be one which reaches the saturation voltage $V_1$ of the phase shifter 18 at time point $t_{11}$, say, 0.5 sec. limits the rate of acceleration change within an allowable range before the time point $t_{11}$. At or after the time point $t_{11}$, the phase shifter 18 is kept saturated as long as a voltage not lower than $V_1$ is maintained, so that the thyristors are also maintained in a fully conducting state. As a result, the motor is freely accelerated with a full voltage supplied thereto and maintains a steady running operation in the vicinity of the synchronous speed. The command voltage applied to the phase shifter 18 therefore may be increased up to a given initial value $V_2$ of the command voltage required at the time of deceleration as shown in FIG. 3b.

In this way, when a command voltage is produced by the acceleration and deceleration speed command generator 16 and applied through the contact element 13-3(b) to the phase shifter 18, the elevator car is accelerated substantially in the manner as diagrammatically illustrated in FIG. 3a. In this case, the rate of acceleration change should be set within the allowable range during the up travel under no load and the down travel under full load which are the most favorable condition for acceleration of the elevator car. This most favorable condition is available only for a short period of time up to time point $t_{11}$ in FIG. 3b, after that, acceleration is supported by the maximum torque of the motor independently of load. Thus, the elevator car is accelerated up to the synchronous speed or the vicinity thereof in shorter period of time at the time of up travel under no load or down travel under full load, while a little more time is required for the elevator car to be accelerated up to the synchronous speed level or the vicinity thereof at the time of up travel under full load or down travel under no load.

This system provides the shortest acceleration time on a certain condition of a feeling of a comfortable ride, motor power capacity and maximum allowable current value, thereby attaining the highest operating efficiency of the motor and other devices while shortening the elevator operating time.

When a steady running elevator car reaches a deceleration-starting point in front of a destination floor, a well-known position detector is actuated thereby to cut off the contactors 9 while closing the contactors 13.

The configuration of the main circuit is changed over to the connection as shown in FIG. 2b. The output of the acceleration and deceleration speed command generator 16, after being compared with the output of the tachometer generator 7, is applied to the phase shifter 18 through the contact element 13-3(a), thus making up a speed feedback control system to provide the DC braking torque. After passing the deceleration-starting point, the acceleration & deceleration speed command generator 16 produces a speed command as shown in FIG. 3b which decreases as a function of position, according to a wellknown method. Let the speed command be Vs and the output voltage of the speed generator 7 be Vp. The thyristors 11 and 12 are phase-controlled in such a manner as to meet $Vp - Vs = 0$. The elevator car is accordingly reduced in speed in response to the speed command as shown in FIG. 3a.

When the elevator car thus is reduced in speed down to a slow speed about to stop or very low speed, the elevator car is held stationary by the electromagnetic braking device 5.

Figure 6:
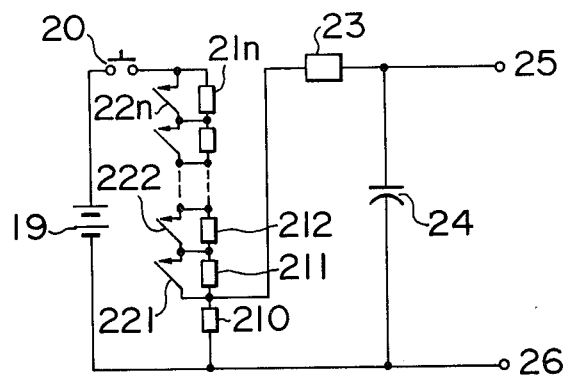
FIG. 6 is a circuit diagram showing a preferred embodiment of the acceleration and deceleration speed command generator according to the invention.

The diagram of FIg. 6 shows a preferred embodiment of the circuit of the acceleration and deceleration speed command generator 16 capable of producing both an acceleration command and a speed command for deceleration in the common circuit thereof.

A DC power supply 19 is for generating a voltage $V_2$ and connected to the resistors 210, 211, 212, .... 21n through a contact element 20 which is adapted to close at the time of the starting of the elevator car. The resistors 211, 212, .... 21n are connected in shunt with the contact elements 221, 222, .... 22n respectively. These contact elements are position-detecting contactors which are closed at the time of starting and opened in sequence as the elevator car approaches a destination after passing the deceleration start point. A time-constant circuit including a resistor 23 and a capacitor 24 is connected across a resistor 210, so that a command voltage is generated from the terminals 25 and 26 of the capacitor 24.

When the contact 20 is closed in response to the elevator start command, the full-voltage $V_2$ of the power supply 19 is applied to the resistor 210. The voltage across the capacitor 24, namely, the command voltage is increased by the time constant due to the resistor 23 and the capacitor 24. The final value of this voltage is equal to the source voltage $V_2$, and the time constant may be so selected that the rate of initial voltage increase corresponds to the rate of acceleration change mentioned earlier. With the approach to $V_2$, the rate of command voltage increase is decreased, even though after saturation of the phase shifter 18, the thyristors 11 and 12 are kept fully conducted independently of the rate of acceleration change, as mentioned already. It suffices, therefore, if the command voltage reaches the source voltage $V_2$ prior to the elevator car reaching the deceleration start point.

Following the deceleration start point, the contact elements 221, 222, .... 22n are opened in the order according to elevator positions, so that the voltage across the resistor 210 drops in steps. The voltage across the capacitor 24 or the output voltage thereof is smoothed by the time constant, making it possible to obtain a deceleration speed command which is reduced substantially in a straight line.

Figure 7:
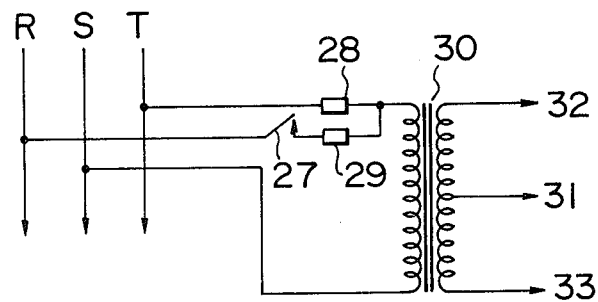
FIGS. 7 and 8 are circuit diagrams showing a preferred embodiment of the phase shifter according to the invention.
Figure 8:
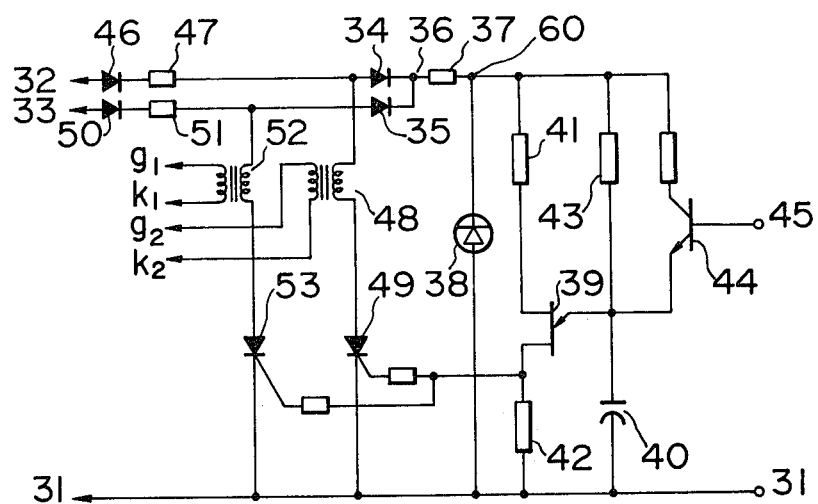

FIGS. 7 and 8 show a preferred embodiment of the phase shifter 18 which is arranged to be able to control the firing of the thyristors 11 and 12 used in common for acceleration, steady running and deceleration periods of the elevator operation through a single circuit.

The voltage applied to the thyristors 11 and 12 is an S-phase voltage in the case of FIG. 2a and a line voltage between S and T in the case of FIG. 2b, and then power supply for the phase shifter 18 is switched over accordingly.

A switching circuit of the power supply for the phase shifter is shown in FIG. 7. During the acceleration and steady running periods, the contact element 27 is closed. The resistors 28 and 29 have the same resistance value. The transformer 30 is thus supplied with the S-phase voltage. The terminals 31, 32 and 33 are connected to the terminals denoted by identical reference numerals in FIG. 8, by way of the secondary winding with an intermediate tap. In the deceleration period, on the other hand, the contact element 27 is opened, so that the transformer 30 is supplied with the S-T line voltage. In similar fashion, power is supplied to a pulse generator circuit in FIG. 8.

In FIg. 8, the diodes 34 and 35 are for full-wave rectification of the secondary voltage of the transformer 30. The full-rectified voltage appearing between points 36 and 31 is applied to the series-circuit of the resistor 37 and the zener diode 38. A full-wave rectified voltage clipped by the zener voltage is produced across the zener diode 38, namely, between points 60 and 31. A unijunction transistor 39, a capacitor 40 and resistors 41 to 43 make up a well-known pulse generator circuit, which is capable of producing a pulse voltage across the resistor 42 at a phase corresponding to the magnitude of the control voltage applied between the base 45 of the transistor 44 and the terminal 31.

This pulse voltage is produced in each half cycle of the source voltage of the phase shifter. In order to distribute this pulse voltage between the thyristors 11 and 12, a couple of lines are provided; one line from terminals 32 to 31 containing series-connection of diode 46, a resistor 47, a pulse transformer 48 and a thyristor 49, and the other line from terminals 33 to 31 containing series-connection of diode 50, a resistor 51, a pulse transformer 52 and a thyristor 53. The pulse signal is applied as a gate signal to the thyristors 49 and 53 in respective lines. Since these thyristors are supplied with different half-wave rectified voltages, they conduct alternately every half wave, thus enabling the amplified pulse voltage to applied to the pulse transformers 48 and 52. The terminals $g_1$, $k_1$ and $g_2$, $k_2$ of the secondary windings of the pulse transformers 48 and 52 are connected respectively to the terminals of identical reference numerals of the thyristors 11 and 12 in FIG. 1.

This circuit arrangement permits a phase shifter circuit to control in common the firing of the thyristors in the driving torque controlling elements and braking torque control elements.

It will be understood from the foregoing description that, according to the present invention, a simple and economical apparatus for controlling the elevator with satisfactory performance is provided for the AC-operated elevator in which the driving torque control elements are controlled with an open loop control for a speed at the time of acceleration while the braking torque control elements are subjected to a speed feedback control at the time of deceleration.

In the case where the driving torque control elements are controlled to produce the full output early in the acceleration period, both the coefficient of utilization of the apparatus and the operating efficiency of the elevator car are improved. Specifically, consider a conventional AC-operated elevator car at the speed of 60 m/min which is subjected to speed feedback control over the whole range. The acceleration time of 2 seconds is always required since it is unified with the acceleration time under the heaviest load such as imposed by down travel under no load and up travel under full load. According to the aforementioned embodiment of the present invention, by contrast, the acceleration time is 1 second in the case of down travel under full load and up travel under no load, though the acceleration time for the down travel under no load and the up travel under full load remains the same as that for the conventional apparatus. The average acceleration time for the apparatus according to the invention is therefore 1.5 seconds, and the operating efficiency is greatly improved.

Even in the conventional system, it is possible to achieve an acceleration time as short as that for the invention by increasing the allowable value of the starting current with the same motor. The starting current, however, is increased by 25% to 30% as compared with the embodiment under consideration, inevitably resulting in an increased capacity of the power supply equipment.

In addition, a further improved economy of the apparatus according to the invention is attained by providing a common device for producing the acceleration command for acceleration and the speed command for deceleration.

Figure 9:
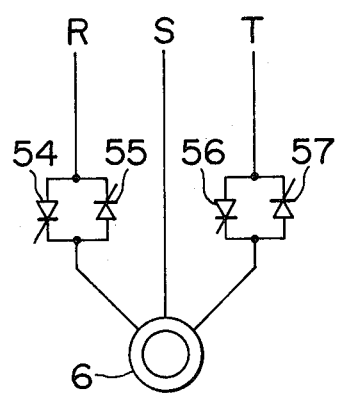
FIGS. 9 and 10 show modifications of the main circuit.
Figure 10:
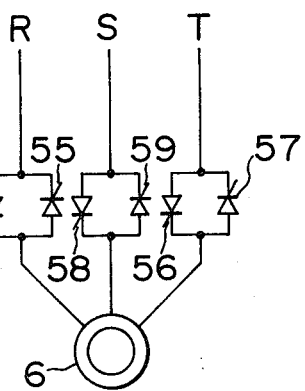

The driving torque control elements may preferably be comprised of the thyristors in inverse-parallel connection inserted between the AC power supply and the induction motor as shown in FIG. 2a. In addition to the single-phase control, the two-phase or three-phase control is possible as shown in FIGS. 9 and 10, respectively. In the drawings, reference numerals 54 to 59 show thyristors.

Instead of a couple of thyristors in inverse-parallel connection, a thyristor and a diode may be connected in inverse-parallel thereby to accomplish the primary voltage control for any of single to three phases.

In the last-mentiond case, the single phase control is economically preferable in view of the feature of the invention that the driving torque control by the primary voltage control is used only for a short period of time after starting the elevator car and also in view of the waveform of current flowing into the motor from the power supply.

In the case of primary single phase control which is effected by the thyristors in inverse-parallel connection as the driving torque control elements for the reason described above, a more economical apparatus is realized if the thyristors are used as the braking torque control elements in the manner as described with reference to FIGS. 1 and 2.

What is claimed is:

1. An AC-operated elevator control apparatus comprising: an induction motor for driving an elevator car; driving torque control elements for continuously controlling the driving torque generated in said induction motor; braking torque control elements for continuously controlling the braking torque generated in said induction motor; means for generating a speed command signal at least for deceleration of the elevator car;

means for producing a speed signal representing the actual speed of the elevator car; acceleration control means for controlling said driving torque control elements with an open control loop for speed regulation at the time of acceleration of the elevator car by supplying a gradually increased speed command signal to said driving torque control elements; and speed feedback control means for controlling said braking torque control elements with a closed control loop for speed regulation in accordance with a deviation signal representing the difference between said speed signal and said speed command signal at the time of deceleration of the elevator car.

2. An AC-operated elevator control apparatus according to claim 1, in which said acceleration control means includes means for generating a predetermined torque-increasing command and means for controlling said driving torque control elements in response to an output of said command generator means.

3. An AC-operated elevator control apparatus according to claim 1, in which said speed command generator means is arranged to produce a command voltage which is increased at the time of accelertion of the elevator car and switched to a speed command at the time of deceleration, said apparatus further including means for controlling said driving torque control elements in accordance with said command voltage at the time of acceleration of the elevator car.

4. An AC-operated elevator control apparatus according to claim 1, in which said driving torque control elements and said braking torque control elements comrpise a bridge circuit and a plurality of change-over contactors, said bridge circuit including a couple of series-connected thyristors and a couple of series-connected diodes connected in parallel with said thyristors, said bridge circuit being changeable to said driving torque control elements including said thyristors in inverse-parallel connection or said braking torque control elements including a controlled rectifier circuit.

5. An AC-operated elevator control apparatus according to claim 4, further comprising a phase shifter with a couple of output terminals permanently connected to the gates and the cathodes of said couple of thyristors respectively.

6. An AC-operated elevator control apparatus according to claim 5, further comprising means for switching a voltage applied to said phase shifter from a three-phase AC power supply, said voltage being a single-phase voltage at the time of acceleration of the elevator car and a line voltage at the time of deceleration of the elevator car.

7. An AC-operated elevator control apparatus comprising a three-phase induction motor for driving an elevator car, driving and braking torque control elements connected between said motor and a three-phase AC power supply for continuously controlling the driving torque and the braking torque generated in said induction motor respectively, a tachometer generator coupled to said motor, first means for producing a continuous speed command for increasing a speed with time from the start of the elevator car and for decreasing a speed in accordance with elevator car position at the time of deceleration of the elevator car, a phase shifter for producing a phase-controlled firing signal for said thyristors, second means for applying said speed command direct to said phase shifter at the time of acceleration of the elevator car, and third means for applying a signal representing a deviation signal between the output signal of said tachometer generator and said speed command applied to said phase shifter, said driving/braking torque control elements including a bridge circuit and a plurality of contactors switchable between different states at the time of acceleration and deceleration of the elevator car, said bridge circuit including a couple of series-connected thyristors and a couple of series-connected diodes permanently connected with said thyristors, said second means causing said driving/braking torque control elements to make up said couple of thyristors in inverse-parallel connection at the time of acceleration of the elevator car, said third means causing said driving/braking torque control elements to make up a controlled-rectifier circuit including said couple of thyristors and said couple of diodes at the time of deceleration of the elevator car.

8. A AC-operated elevator control apparatus claimed in claim 1, wherein said gradually-increased command signal increases at a predetermined rate of change with lapse of time.

9. An AC-operated elevator control apparatus claimed in claim 8, wherein said predetermined rate of change is established to be larger than a rate of change in the decrease of the speed command at the time of deceleration of the elevator car.

10. An AC-operated elevator control apparatus comprising: an induction motor for driving an elevator car; driving torque control elements for continuously controlling the driving torque generated in said induction motor; braking torque control elements for continuously controlling the braking torque generated in said induction motor; means for generating a command signal gradually increasing at the time of acceleration of the elevator car and connecting with a speed command for deceleration of the elevator car; means for generating a speed signal representing an actual speed of the elevator car; acceleration control means for controlling said driving torque control elements with an open control loop for a speed at the time of acceleration of the elevator car by supplying a gradually-increased command signal to said driving torque control elements; and speed feedback control means for controlling said braking torque control elements in accordance with a deviation signal between said speed signal and said speed command at the time of deceleration of the elevator car.

11. An AC-operated elevator control apparatus claimed in claim 10, wherein said gradually-increased command signal increases at a predetermined rate of change with lapse of time.

12. An AC-operated elevator control apparatus claimed in claim 11, wherein said predetermined rate of change is established to be larger than a rate of change in decrease of the speed command at the time of deceleration of the elevator car.

13. An AC-operated elevator control apparatus claimed in claim 10, wherein said driving torque control elements and said braking torque control elements comprise a bridge circuit and a plurality of change-over contactors, said bridge circuit including a couple of series-connected thyristors and a couple of series-connected diodes connected in parallel with said thyristors, said bridge circuit being constituted so as to be changeable to said driving torque control elements including said thyristors in inverse-parallel connection or said braking torque control elements including a controlled rectifier circuit.

14. An AC-operated elevator control apparatus claimed in claim 13, further comprising a phase shifter with a couple of output terminals permanently connected between the gates and the cathodes of said couple of thyristors respectively.

15. An AC-operated elevator control apparatus claimed in claim 14, further comprising means for switching a voltage applied to said phase shifter from a three-phase AC power supply, said voltage being a single-phase voltage at the time of acceleration of the elevator car and a line voltage at the time of deceleration of the elevator car.

16. An AC-operated elevator control apparatus comprising: an induction motor for driving an elevator car; driving and braking torque control elements for continuously controlling the driving torque and the braking torque generated in said induction motor, said control elements comprising a bridge circuit including a couple of series-connected thyristors and a couple of series-connected diodes permanently connected to each other, and a plurality of change-over contactors switchd over at the time of acceleration and deceleration of the elevator car; a tachometer generator coupled to said motor; means for generating a continuous speed command, said speed command increasing with lapse of time from the start of the elevator car and decreasing in accordance with an elevator car position at the time of deceleration of said elevator car; a phase shifter for supplying a phase-controlled firing signal to said couple of thyristors; means for causing said driving and braking torque control elements to make up said couple of thyristors in inverse-parallel connection at the time of acceleration of the elevator car and for applying said speed command directly to said phase shifter; means for causing said driving and braking to make up a controlled-rectifier circuit including said couple of thyristors and said couple of diodes at the time of deceleration of the elevator car and for applying a deviation signal between an output of said tachometer generator and said speed command directly to said phase shifter.

* * * * *